United States Patent
Wen

(10) Patent No.: US 9,218,234 B2
(45) Date of Patent: Dec. 22, 2015

(54) MEMORY DUMP AND ANALYSIS IN A COMPUTER SYSTEM

(71) Applicant: Marvell World Trade Ltd., St. Michael (BB)

(72) Inventor: Lei Wen, Shanghai (CN)

(73) Assignee: MARVELL WORLD TRADE LTD., St. Michael (BB)

( * ) Notice: Subject to any disclaimer, the term of this patent is extended or adjusted under 35 U.S.C. 154(b) by 134 days.

(21) Appl. No.: 13/864,550

(22) Filed: Apr. 17, 2013

(65) Prior Publication Data

US 2013/0290789 A1 Oct. 31, 2013

Related U.S. Application Data

(60) Provisional application No. 61/639,456, filed on Apr. 27, 2012.

(51) Int. Cl.
*G06F 11/00* (2006.01)
*G06F 11/07* (2006.01)

(52) U.S. Cl.
CPC .......... *G06F 11/079* (2013.01); *G06F 11/0778* (2013.01); *G06F 11/0784* (2013.01); *G06F 11/0787* (2013.01); *G06F 11/0742* (2013.01); *G06F 11/0748* (2013.01); *G06F 11/0793* (2013.01)

(58) Field of Classification Search
USPC ...................................... 714/38.11, 15; 713/2
See application file for complete search history.

(56) References Cited

U.S. PATENT DOCUMENTS

| | | | |
|---|---|---|---|
| 6,697,973 B1 | 2/2004 | Baumeister, IV et al. | |
| 6,728,907 B1* | 4/2004 | Wang et al. | 714/47.1 |
| 7,302,559 B2 | 11/2007 | Oguma | |
| 7,412,352 B1* | 8/2008 | Fagerstrom | 702/186 |
| 7,594,143 B2* | 9/2009 | Chin et al. | 714/38.11 |
| 7,631,224 B2* | 12/2009 | Oguma | 714/37 |
| 7,788,537 B1* | 8/2010 | Yellen et al. | 714/38.11 |
| 7,823,006 B2* | 10/2010 | Grant et al. | 714/5.11 |
| 7,890,814 B2* | 2/2011 | Zhang et al. | 714/45 |

(Continued)

FOREIGN PATENT DOCUMENTS

EP 2333668 6/2011

OTHER PUBLICATIONS

International Search Report and Written Opinion dated Oct. 29, 2013 from related/corresponding PCT Patent Application No. PCT/IB2013/001078 filed Apr. 17, 2013.

(Continued)

*Primary Examiner* — Kamini Patel

(57) ABSTRACT

Systems and methods for executing a memory dump in a computer system are provided. A trigger event is detected in the computer system. The computer system is configured to detect both a kernel panic and a system hang and to execute memory dump if either of the kernel panic or the system hang is detected. The memory dump is executed in the computer system in response to the detecting of the trigger event. The executing of the memory dump includes storing a current context of the computer system in a portion of a memory device. The current context is stored without reserving the portion prior to the detecting of the trigger event. The computer system is restarted and a bootstrap program is executed, where a running space of the bootstrap program is restricted to the portion of the memory device. The bootstrap program is used to upload the current context to a host device.

18 Claims, 8 Drawing Sheets

(56) References Cited

U.S. PATENT DOCUMENTS

| | | | |
|---|---|---|---|
| 8,375,386 B2 | 2/2013 | Hendel | |
| 8,645,763 B2* | 2/2014 | Szegedi et al. | 714/38.11 |
| 8,959,416 B1* | 2/2015 | Malonzo | 714/763 |
| 2006/0069944 A1* | 3/2006 | Oguma | 714/5 |
| 2006/0168439 A1* | 7/2006 | Oguma | 713/2 |
| 2006/0218388 A1* | 9/2006 | Zur et al. | 713/2 |
| 2008/0103736 A1* | 5/2008 | Chin et al. | 703/2 |
| 2008/0301501 A1* | 12/2008 | Grant et al. | 714/37 |
| 2010/0161863 A1* | 6/2010 | Cota-Robles et al. | 710/220 |
| 2010/0229112 A1* | 9/2010 | Ergan et al. | 715/764 |
| 2010/0275060 A1* | 10/2010 | Liu et al. | 714/15 |
| 2011/0035618 A1* | 2/2011 | Jann et al. | 714/3 |
| 2012/0124420 A1 | 5/2012 | Yamagami | |
| 2012/0131380 A1 | 5/2012 | Horman et al. | |
| 2013/0067178 A1* | 3/2013 | Szegedi et al. | 711/155 |
| 2013/0067285 A1* | 3/2013 | Szegedi et al. | 714/45 |
| 2013/0346369 A1* | 12/2013 | Kondou et al. | 707/642 |

OTHER PUBLICATIONS

International Preliminary Report on Patentability issued in related/corresponding PCT Patent Appl. No. PCT/IB2013/001078 filed Apr. 17, 2013.

* cited by examiner

MEMORY DUMP AND ANALYSIS IN A COMPUTER SYSTEM

CROSS-REFERENCE TO RELATED APPLICATIONS

This disclosure claims priority to U.S. Provisional Patent Application No. 61/639,456, filed on Apr. 27, 2012, which is incorporated herein by reference in its entirety.

TECHNICAL FIELD

The technology described in this document relates generally to systems and methods for performing a memory dump in a computer system and more particularly to systems and methods for performing a memory dump and post-mortem analysis in an embedded device.

BACKGROUND

With the widespread use of information communications technology, an information processing system such as a desktop computer, a laptop computer, or an embedded device (e.g., smartphone, personal digital assistant, tablet computer) should exhibit a high degree of reliability. When a failure occurs during operation of the information processing system, it may be important to immediately collect information on the failure and to thereafter continue normal operation of the system. An example of a failure that may occur in the information processing system is a kernel panic. The kernel panic is an action taken by an operating system (OS) of the information processing system upon detection of a fatal error from which the system cannot safely recover. Upon detection of the kernel panic, the system may output an error message to a display device and perform a memory dump for post-mortem debugging. The memory dump is used to store the contents of the system's memory at the moment when the fatal error is detected. Normally, the OS or a program operating in an OS kernel performs the dumping process. For example, when a central processing unit (CPU) of the system receives an interrupt signal indicting that a fatal error has occurred, the CPU may pass control to a memory dump program in the OS kernel to perform the memory dump operation.

SUMMARY

The present disclosure is directed to systems and methods for executing a memory dump in a computer system. In a method for executing a memory dump in a computer system, a trigger event is detected in the computer system. The computer system is configured to detect both a kernel panic and a system hang and to execute the memory dump if either of the kernel panic or the system hang is detected. The memory dump is executed in the computer system in response to the detecting of the trigger event. The executing of the memory dump includes storing a current context of the computer system in a portion of a memory device. The current context is stored without reserving the portion prior to the detecting of the trigger event. The computer system is restarted and a bootstrap program is executed, where a running space of the bootstrap program is restricted to the portion of the memory device. The bootstrap program is used to upload the current context to a host device.

In another example, a system for executing a memory dump in a computer system includes a processor and a computer-readable memory encoded with instructions for commanding the processor to perform operations. The operations include detecting a trigger event in the computer system, where the computer system is configured to detect both a kernel panic and a system hang and to execute the memory dump if either of the kernel panic or the system hang is detected. The operations also include executing the memory dump in the computer system in response to the detecting of the trigger event. The executing includes storing a current context of the computer system in a portion of a memory device, where the current context is stored without reserving the portion prior to the detecting of the trigger event. The computer system is restarted and a bootstrap program is executed, where a running space of the bootstrap program is restricted to the portion of the memory device. The bootstrap program is used to upload the current context to a host device.

DETAILED DESCRIPTION

Figure 1:
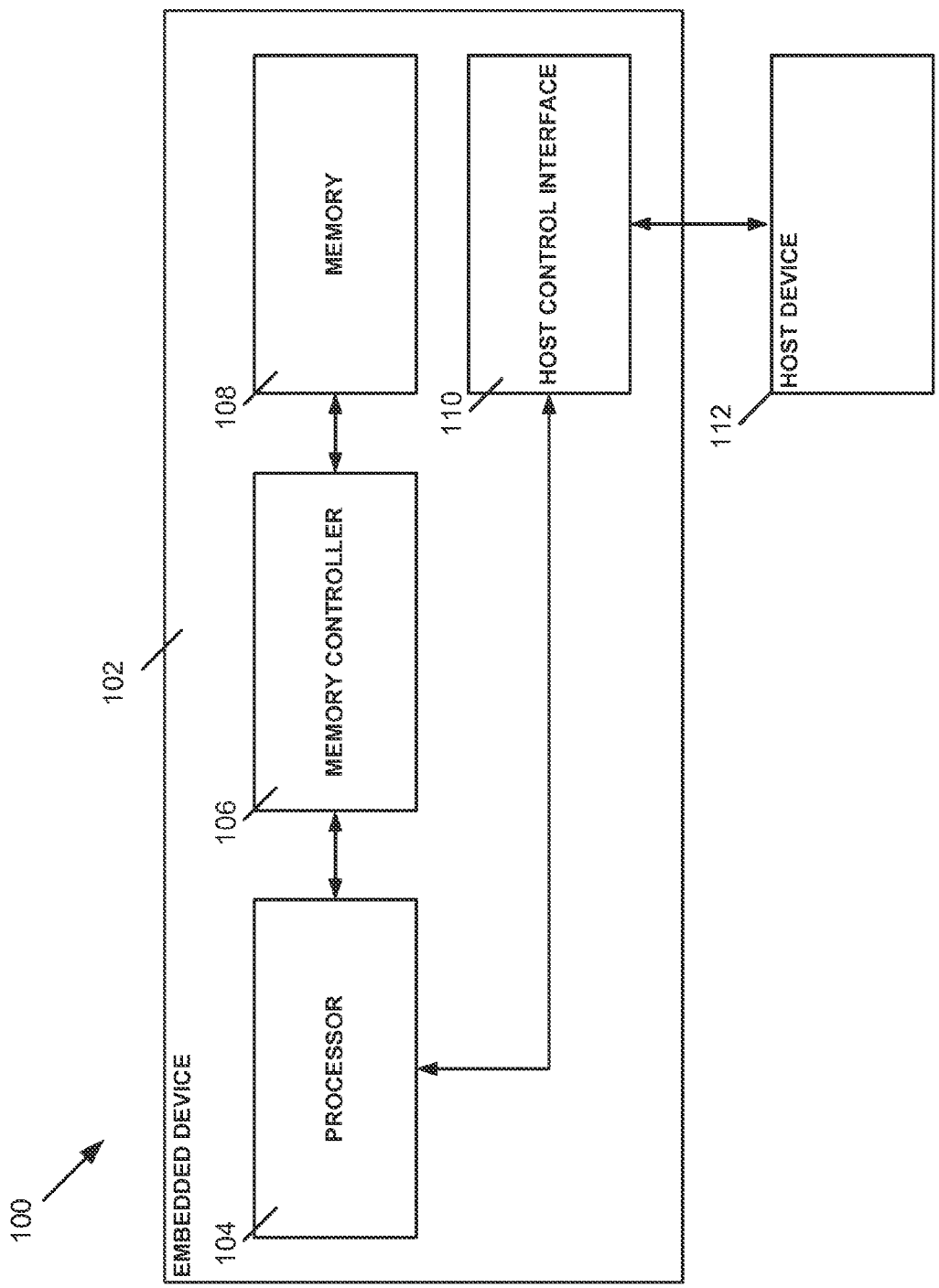
FIG. 1 is a block diagram depicting an example embedded device and host device for performing a memory dump and post-mortem analysis.

FIG. 1 is a block diagram 100 depicting an example embedded device 102 and host device 112 for performing a memory dump and post-mortem analysis. The embedded device 102 includes a processor 104, a memory controller 106, a memory 108, and a host control interface 110. The processor 104 may be a general purpose processing unit known to those of skill in the art of computing that is capable of processing tasks driven by internal or external interrupts. The processor 104 may be connected to various input devices and output devices (e.g., keyboard, touchpad, display device, speakers, etc.) of the embedded device 102 and coupled to any number of different memory devices (e.g., read only memory, random access memory, disk drives, and the like). Although the block diagram 100 depicts the example embedded device 102 as including a single processor 104, in other examples, a plurality of processing cores may be used to carry out instructions of computer programs. The processor 104 and other components of the embedded device 102 communicate with the host device 112 via the host control interface 110. The host control interface 110 may utilize, for example, a Universal Serial Bus (USB) protocol to enable the communications between the embedded device 102 and the host device 112. Other types of host control interfaces may be used (e.g., Joint Test Action Group interface, Inter-Integrated Circuit interface, Local Area Network interface, or the like).

In the example embedded device 102 of FIG. 1, the processor 104 is coupled to the memory 108, which may be any combination of random access memory (RAM), dynamic RAM (DRAM), static RAM (SRAM), synchronized DRAM (SDRAM), FLASH memory, or the like. The memory 108 may further be a NOR type flash memory, a NAND type flash memory, or a MultiMediaCard memory (e.g., eMMC memory), among others. The processor 104 accesses the memory 108 via the memory controller 106. When the processor 104 needs to access the memory 108, a read request or a write request is sent from the processor 104 to the memory controller 106, and the memory controller in turn sends a corresponding read request or a write request to the memory 108. Consequently, data from the processor 104 can be written to the memory 108, or data can be read from the memory 108 to the processor 104.

When a failure occurs during operation of the embedded device 102, information on the failure is collected for post-mortem analysis and debugging. An example of a failure that may occur in the embedded device 102 is a kernel panic. The kernel panic is an action taken by an OS of the embedded device 102 upon detection of a fatal error. In one example, the embedded device 102 uses a Linux (registered trademark) OS, which includes a kernel panic routine for handling such fatal errors. A kernel may form the core of the OS and may be used in managing the resources of the embedded device 102 and providing additional services such as the kernel panic routine. Another example of a failure that may occur in the embedded device 102 is a system hang (i.e., freeze). The system hang occurs when a single program or all programs of the device 102 cease to respond to inputs. For example, aspects of the display of the embedded device 102 may become static, with no type of input producing any effect within the embedded device 102.

The kernel panic and the system hang serve as trigger events for the embedded device 102. The embedded device 102 is configured to detect both the kernel panic and the system hang and to collect information on the failure for post-mortem analysis if either of these trigger events is detected. The collecting of information on the failure occurs via a memory dump. The memory dump is used to store contents of memory 108 at the moment when the kernel panic or system hang is detected.

In executing the memory dump, a Linux kernel dump mechanism (e.g., the "Kdump" utility) stores the current contexts of the embedded device 102 in a portion of the memory 108 and writes a signature to a specific page of the memory 108. To store the current contexts and write the signature, the Linux kernel does not specifically reserve a space while running to load a second kernel to be triggered in the case of the kernel panic or system hang. Rather, the current context is stored without reserving the portion of the memory 108 prior to the detecting of the trigger event. When the kernel panic or system hang is detected, the current contexts are stored in a portion of the memory 108 that is generally reserved for use as a video memory in the embedded device 102. Using the video memory for the memory dump has minimal influence while the Linux kernel is functioning normally. Storing the current contexts in this manner allows the memory dump to be performed without reserving a large portion of the memory 108.

In a further aspect of the memory dump, the embedded device 102 is restarted and a bootstrap program (e.g., a modified version of the "U-Boot" bootloader program) is executed. Generally, the bootstrap program is a computer program that loads the OS of the embedded device 102 into the memory 108 and packages instructions to boot the OS kernel. In performing the memory dump, the bootstrap program is adapted to be used with the memory 108, such that a running space of the bootstrap program can be restricted to the portion of the memory 108 where the current contexts were stored (i.e., the video memory portion described above). The bootstrap program operating within the portion of the memory 108 detects whether the signature exists in the specific page of the memory 108. Upon detection of the signature at the specific page of the memory 108, the bootstrap program interrupts a normal starting process of the embedded device and performs further actions in accordance with the memory dump.

The further actions performed by the bootstrap program include uploading the current contexts stored in the portion of the memory 108 to the host device 112 via the host control interface 110. In order to perform the uploading, a connection must be established between the embedded device 102 and the host device 112. After the connection is established, the bootstrap program uploads the current contexts to the host device 112. The host control interface 110 uses a Universal Serial Bus (USB) protocol for performing the uploading. In one example, the USB protocol is based on the "Fastboot" protocol of the Android (registered trademark) OS. The Fastboot protocol is a protocol based directly on USB bottom-layer data packets. The original Fastboot protocol includes functionality for file downloading and does not include functionality for file uploading. However, in the embedded system 102 of FIG. 1, a modified version of the Fastboot protocol including upload functionality is used. Prior to uploading, the current contexts in the portion of the memory 108 may be compressed (e.g., using the "zlib" software compression library), thus reducing upload time.

After upload of the current contexts from the embedded device 102 to the host device 112, the host device performs post-mortem analysis on the current contexts. To perform the post-mortem analysis, the host device 112 stores the current contexts as a mapping file. In one example, a modified version of the "Crash Utility" application is used in performing the post-mortem analysis. Crash Utility is a Linux kernel dump map analysis tool developed and maintained by Red Hat, Inc. (registered trademark). The mapping file stored in the host device 112 may be directly analyzed using the modified version of the Crash Utility application. The original Crash Utility application only provides for viewing of simple data structure contents and lacks functionality for recovering file systems and file contents. The example system of FIG. 1 thus utilizes the modified version of the Crash Utility application that adds functionality for recovering file systems and file contents.

The example system of FIG. 1 enables memory, dump and analysis in the event that either a kernel panic or system hang occur. Further, in the example system of FIG. 1, the memory dump is performed without specifically reserving the portion of the memory 108 for storing memory dump data during the running of the Linux kernel. The uploading of the memory dump data via the USB protocol to the host device 112 enables the files stored in the memory dump data to be browsed and recovered as of the point in time that the embedded device 102 crashed. Although the example system of FIG. 1 is described in terms of an embedded device, the method of memory dump and analysis described herein is applicable to any computer system. For example, either or both of the devices 102, 112 may be personal computers (PCs). The example system of FIG. 1 may be particularly applicable to situations where the embedded device 102 is tested in the open air.

Figure 2:
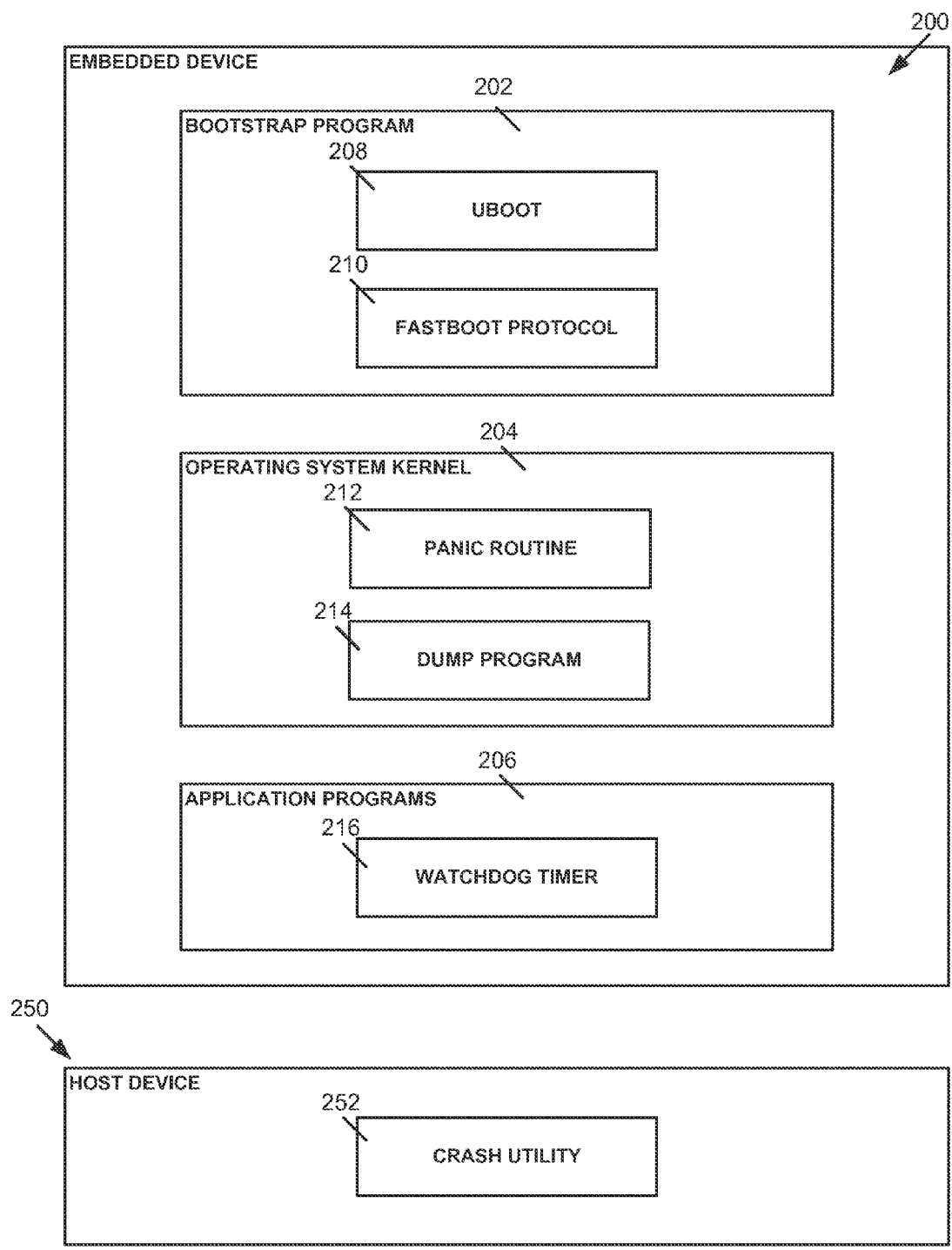
FIG. 2 is a diagram illustrating an example software structure within an embedded device and a host device.

FIG. 2 is a diagram illustrating an example software structure within an embedded device 200 and a host device 250. As described above with respect to FIG. 1, the embedded device 200 may include hardware and software systems for performing a memory dump, and the host device 250 may include hardware and software systems for performing post-mortem memory dump analysis. The software within the embedded device 200 includes a bootstrap program 202, OS kernel 204, and various application programs 206. The software within the host device 250 includes a modified version of the crash utility application 252.

The bootstrap program 202 of the embedded device 200 includes bootloader functionality and functionality for uploading memory dump data to the host device 250. The bootloader functionality is achieved using the U-boot utility 208 or other similar program. As described above, the U-boot utility 208 is adapted for memory storage and can be executed from a particular location in memory, where the particular location in memory is a portion of the memory where the memory dump data is stored. Upon restart of the embedded device 200 following a crash, the bootstrap program 202 determines if further memory dump functions should be performed (e.g., by detecting a signature written to memory by a Linux kernel dump mechanism). If the further memory dump functions are to be performed, the bootstrap program 202 utilizes a modified version of the Fastboot protocol 210 to upload the memory dump data to the host device 250 via a USB protocol.

Programs for controlling the hardware of the embedded device 200 generally operate within the OS kernel 204 included in the OS of the embedded device 200. The OS kernel 204 includes a panic routine 212 and a dump program 214. The panic routine 212 is configured to handle processing of fatal errors from which the embedded device 200 cannot safely recover. For example, the panic routine 212 may output an error message to a display of the embedded device 200 and initiate a memory dump of the kernel memory via the dump program 214. The dump program 214 may be a Linux kernel dump mechanism, such as the Kdump utility. When initiated, the dump program 214 stores the current contexts of the embedded device 200 in a memory of the embedded device 200 and writes a signature to a specific page in the memory.

The embedded device 200 also includes various application programs 206, which may include, among others, a watchdog timer 216. The watchdog timer 216 is an electronic timer that is used to detect and recover from malfunctions in the embedded device 200. Specifically, the watchdog timer 216 is used to enable memory dump functionality in the embedded device 200 in the case of a system hang. During normal operation of the embedded device 200, the embedded device 200 regularly restarts the watchdog timer 216 to prevent the watchdog timer 216 from timing out. If, due to a system hang, the embedded device 200 fails to restart the watchdog timer 216, the watchdog timer 216 elapses and generates a timeout signal. The timeout signal is used to initiate corrective actions, such as a memory dump of the current contexts to a memory of the embedded device 200 and a restart of the embedded device 200. Specifically, in the context of the memory dump and analysis system described in FIG. 1, the watchdog timer 216 can be selected to start in the embedded device 102, and when the embedded device 102 is restarted, it can be detected whether the restart was caused by the watchdog tinier 216. If the watchdog tinier 216 was the reason for the restart, further memory dump procedures may be performed. Using the watchdog timer 216 in this manner, the memory dump and post-mortem analysis is performed in instances of system hang.

The host device 250 includes the modified version of the Crash Utility application 252 for performing post-mortem analysis of a memory dump. As explained above, Crash Utility is a Linux kernel dump map analysis tool that is used to directly analyze a dumped mapping file that is stored in the host device 250. The original Crash Utility application only provides for viewing of simple data structure contents and lacks functionality for recovering file systems and file contents. The modified version of the Crash Utility application 252 adds functionality for recovering file systems and file contents. The recovery of file systems and file contents is explained in greater detail below with respect to FIG. 7.

Figure 3:
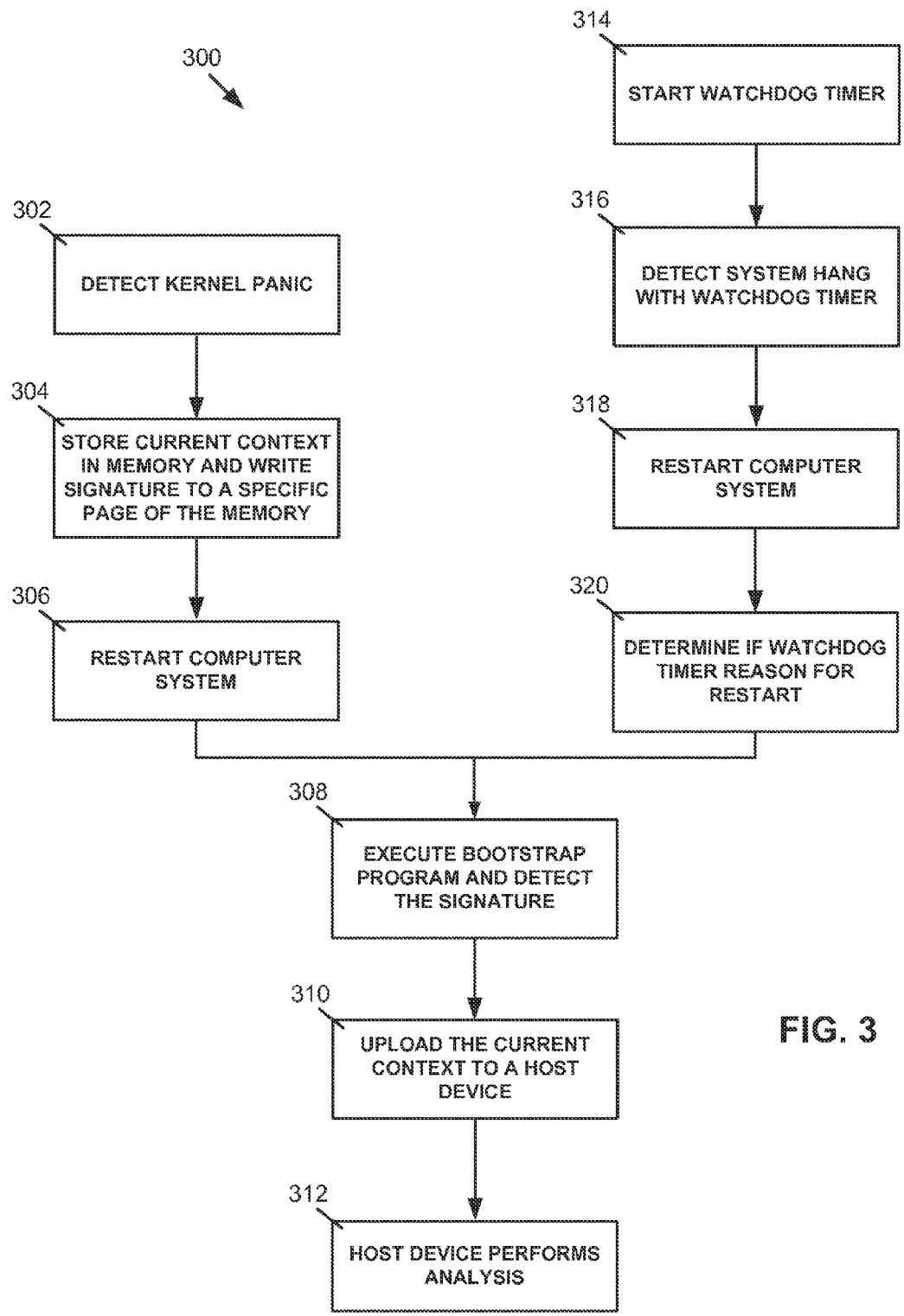
FIG. 3 is a flowchart illustrating an example method for executing a memory dump and post-mortem analysis in response to a kernel panic or detected system hang.

FIG. 3 is a flowchart 300 illustrating an example method for executing a memory dump and post-mortem analysis in response to either a kernel panic or a system hang. At 302, a kernel panic is detected in a computer system. At 304, a Linux kernel dump mechanism (e.g., Kdump) stores a current context of the computer system in a memory and writes a signature to a specific page of the memory. As explained above with respect to FIG. 1, the Linux kernel or the Linux kernel dump mechanism does not need to specifically reserve a space while running to load a second kernel to be triggered in the case of a crash. Because some memories in the computer system are assembly reserved as video memories, these memories are not useful during memory dump and analysis. Thus, the location of the memory dump and the running space of a bootstrap program can be restricted to this area. Using the video memory in this manner has minimal influence when the Linux kernel is running normally, and thus, it is unnecessary to reserve a portion of the memory to be used as a kernel dump area.

At 306, the computer system is restarted. At 308, the computer system executes a bootstrap (i.e. bootloader) program (e.g., U-boot or a modified version thereof), and the bootstrap program detects the signature in the starting process. Upon detection of the signature, the starting process is interrupted and further processing in accordance with the memory dump and post-mortem analysis is performed. At 310, after a connection is established between the computer system and a host device, the data of the memory dump (i.e., the current context stored in the memory) is uploaded to the host device via a USB protocol. At 312, the host device performs analysis on the data of the memory dump. The analysis may include, for example, recovering file systems and file contents.

Alternatively, as described above with respect to FIGS. 1 and 2, the example method for executing the memory dump and post-mortem analysis may also be triggered by a system hang. To enable the memory dump in the case of the system hang, at 314, a watchdog timer is started in the computer system. At 316, the system hang is detected by the watchdog timer. Upon detection of the system hang, a memory dump procedure may be initiated. Thus, a memory dump mechanism may store a current context of the computer system in a memory and write a signature to a specific page of the memory. The Linux kernel or the Linux kernel dump mechanism need not specifically reserve space in memory while running to load a second kernel to be triggered in the case of the system hang. As described above, the area of memory for the memory dump may be an area generally reserved as a video memory.

At 318, the computer system is restarted. At 320, during restarting of the computer system, a determination is made as to whether an expiration of the watchdog timer was the reason for the restarting. If it is determined that the expiration of the watchdog timer was the reason for the restarting, further memory dump procedures are performed. Subsequently, steps 308, 310, and 312, described above, may thereafter be performed to complete the memory dump and post-mortem analysis in response to the system hang.

Figure 4:
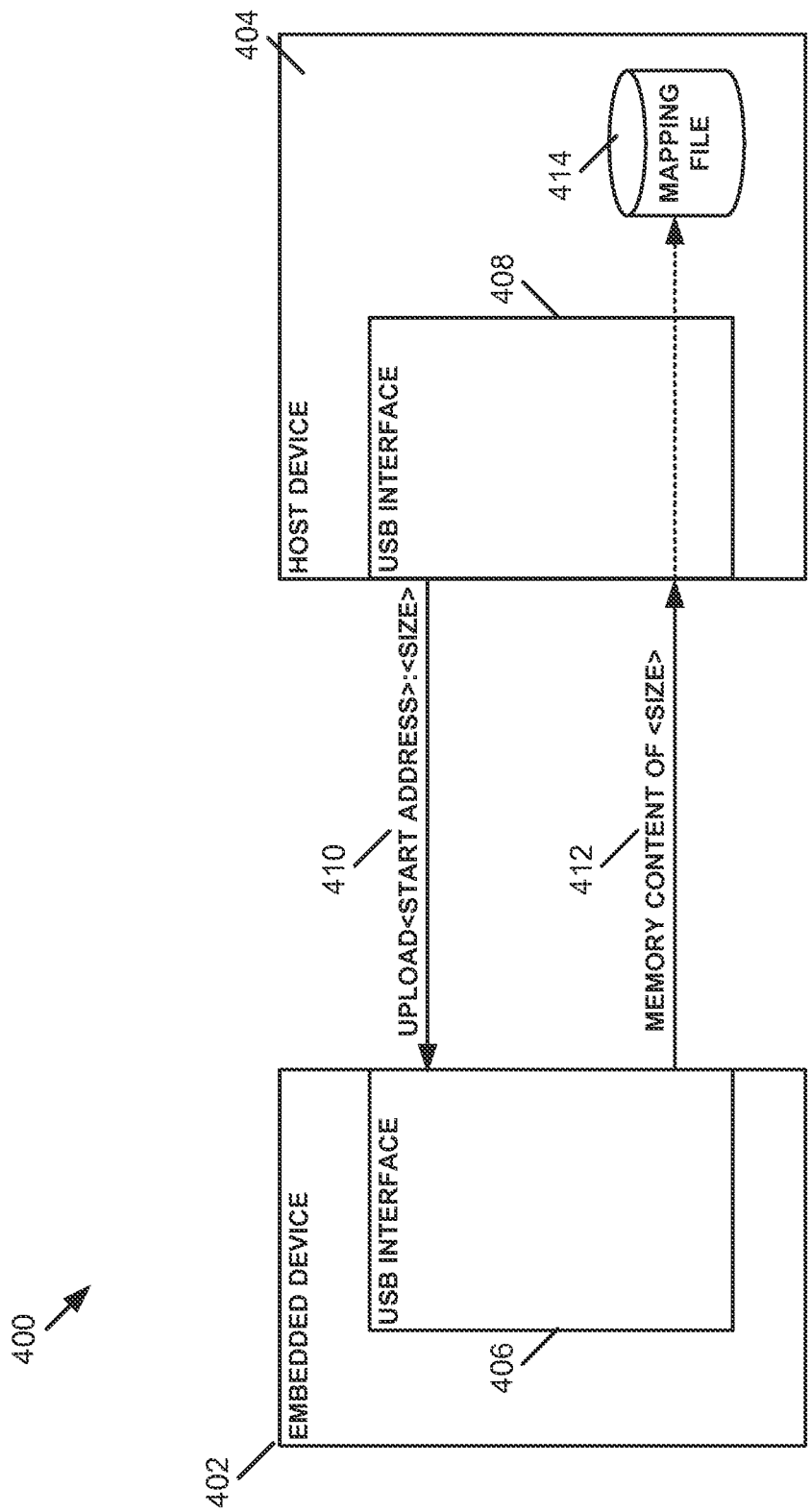
FIG. 4 is a block diagram illustrating aspects of an example upload protocol that is used in transferring memory dump data from an embedded device to a host device.

FIG. 4 is a block diagram 400 illustrating aspects of an example upload protocol that is used in transferring memory dump data from an embedded device 402 to a host device 404. As illustrated in the block diagram 400, both the embedded device 402 and the host device 404 include a USB interface, 406 and 408, respectively, in the example of FIG. 4, after a connection between the embedded device 402 and the host device 404 is established, memory dump data is uploaded from the embedded device 402 to the host device 404 via a USB protocol. The host device 404 may be a personal computer (PC) that is configured to perform analysis and file recovery on the memory dump data uploaded to the host device 404.

The example upload protocol of FIG. 4 is initiated when the host device 404 sends a USB packet 410 to the embedded device 402. The content of the USB packet is "upload<start address>:<size>," as illustrated at 410. An example of the content of the USB packet is "upload0:0x1000," which is an instruction to the embedded device 402 to upload 0x1000 memory content from address 0. After sending the memory request data packet, the host device 404 is ready to read USB data of <size> from the USB interface 408. After receiving the "upload<start address>:<size>" instruction, the embedded device 402 uploads memory content of <size> 412 according to the instruction 410 via the USB interface 406. The embedded device 402 thereafter waits for the next instruction. After receiving the USB data of <size> 412 via the USB interface 408, the host device 404 reads the USB data and stores the data as a mapping file 414. The mapping file may be analyzed in the host device 404 via a Linux kernel dump map analysis tool.

Figure 5:
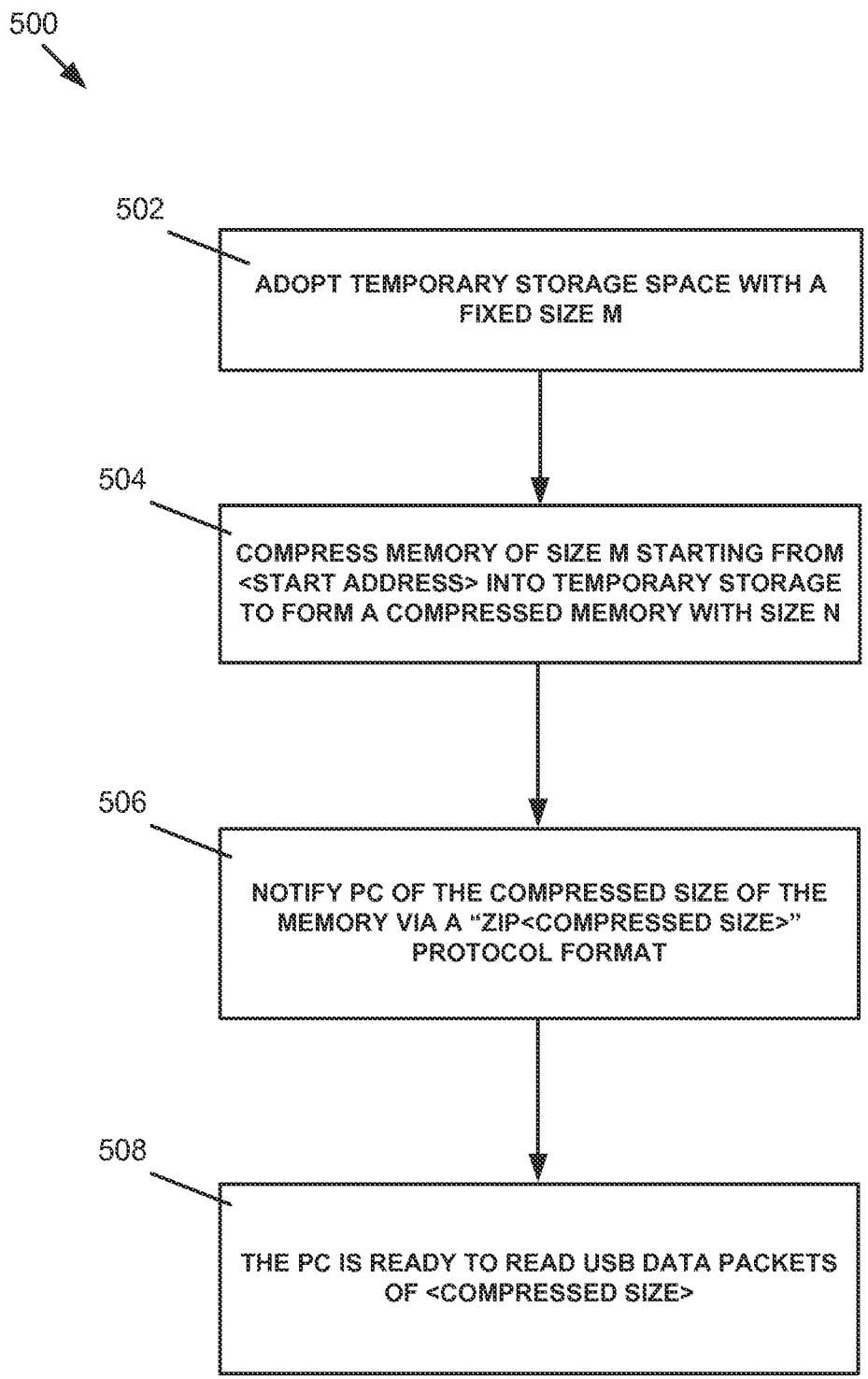
FIG. 5 is a flowchart illustrating an example method for an upload protocol that allows for data to be compressed prior to uploading.

FIG. 5 is a flowchart 500 illustrating an example method for an upload protocol that allows for data to be compressed prior to uploading. With reference to FIG. 4, a host device sends an instruction to an embedded device of the form "upload<start address>:<size>," which is used to instruct the embedded device to upload particular memory content starting from a particular memory address. The example method of FIG. 5 is used to compress a memory interval designated by <start address>:<size> and to thereafter upload the compressed memory interval to the host device. The compression may be performed by various compression libraries including, for example, the "zlib" compression library.

At 502, because a final compression size may not be accurately predicted, the upload protocol adopts temporary storage space with a fixed size M as intermediate storage. With the intermediate storage of size M, the upload protocol performs (<size>+M−1)/M compression processes. At 504, each compression process compresses a memory of size M starting from <start address> into the intermediate storage to form a compressed memory of size N. At 506, the embedded device notifies the host device of the compressed size N. A protocol format of "ZIP<compressed size>" is used, where <compressed size> is a word-type data structure represented by eight (8) characters. At 508, after receiving the "ZIP<compressed size>" instruction, the host device is ready to read USB packets of <compressed size>. After receiving a USB packet of <compressed size>, the host device waits for the next "ZIP<compressed size>" data packet. When the <compressed size> is 0, the host device determines that the transmission process is complete, and all data received is stored in a mapping file.

Figure 6:
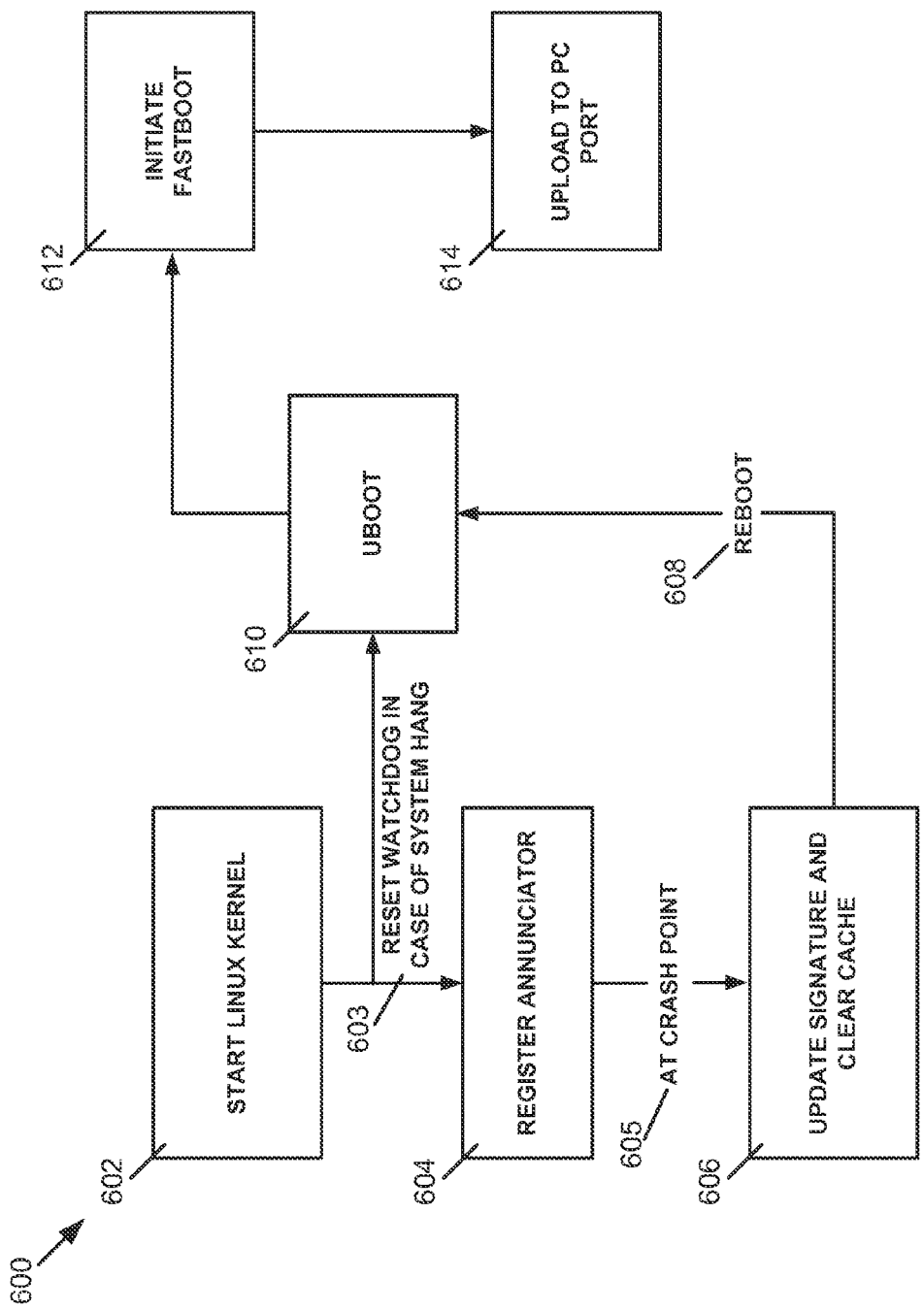
FIG. 6 is a block diagram of an example usage pattern of a Linux memory dump in a computer system.

FIG. 6 is a block diagram 600 of an example usage pattern of a Linux memory dump in a computer system. At 602, the Linux kernel is started. At 603, a watchdog timer is reset in the case of a system hang, and at 604, an annunciator is registered. Registering the watchdog timer during or after kernel booting allows the watchdog timer to function, such that if the watchdog timer is not reset in a specified amount of time (i.e., a system hang occurs), the system is caused to perform a reset operation. As illustrated in FIG. 6, when the reset operation is performed as a result of the watchdog timer, this information is detected by the U-boot bootloader utility at startup, such that the memory dump operation may be performed.

At 605, a system crash occurs, and at 606, a signature is updated in a memory of the computer system and a cache is cleared. Further, at this point, a multiplex Linux kernel dump mechanism (e.g., K-dump) may perform a memory dump by storing the current contexts in the computer system's memory. At 608, the computer system is rebooted. At 610, the U-boot bootloader utility or another similar computer program is executed. The U-boot bootloader utility or other similar program detects the signature written to the memory and interrupts the normal starting process. The U-boot bootloader utility or other similar program is adapted for memory storage, and a location of the running space of the U-boot bootloader utility or other similar program can be restricted to an area of memory that is assembly reserved as video memories. The area of memory to which the U-boot bootloader utility or other similar program is restricted may be the area of memory in which the current contexts were stored by the Linux kernel dump mechanism. At 612, a modified version of the Fastboot protocol including upload functionality is initiated. At 614, contents of the memory dump are uploaded to a PC port. The uploading may be via a USB protocol, and the PC port may be included as part of a host device, where the host device is configured to receive the memory dump contents and to perform analysis and file recovery of the memory dump contents.

Figure 7:
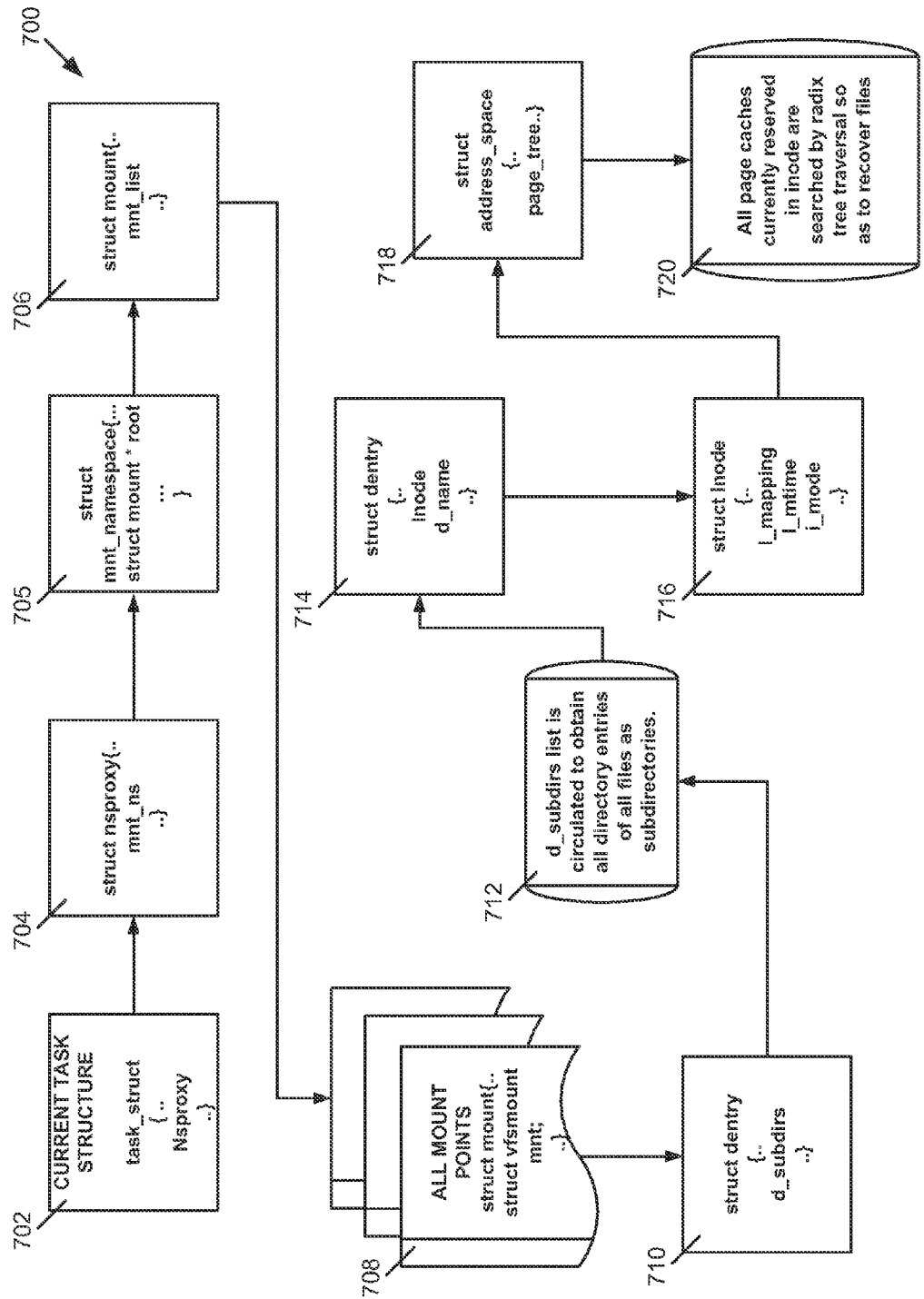
FIG. 7 is a flowchart illustrating an example process for recovering file systems and file contents from a memory.

FIG. 7 is a flowchart 700 illustrating an example process for recovering file systems and file contents from a memory. In Linux, realization of the ramfs/tmpfs file system is based on a page cache, such that ramfs/tmpfs does not have an actual backend storage device, and all of the files are actually stored in a memory (i.e., a page cache of a corresponding allocation page). As long as an mode address of a file expected to be recovered can be obtained, the contents of the file can be recovered by a corresponding radix tree. The files in the tmpfs folder are also accessible from the Linux VFS hierarchy structure. This at structure is similar to a tree, such that if a node is to be located, the locating of the node begins from a root point of the tree.

Finding the root point of the tree may begin from the current task structure, with data that can be immediately accessed. At 702, FIG. 7 illustrates the abstract information for the current task structure, indicating that it has a member for nsproxy with a structure type of "struct nsproxy." At 704, the nsproxy structure is shown, illustrating that it has a member of mnt_ns, which has a structure type of "struct mnt_namespace." At 705, the mnt_namespace structure is shown, illustrating that it has a member of root, which has a structure type of "struct mount." At 706, the mount structure is shown, illustrating that it has a member of mnt_list, which has a structure type of "struct list_head."

At 708, by looping through a list pointed to by the previous mnt_list, each vfsmount structure that presents the mount point can be obtained. The mount structure already contains the vfsmount structure, such that a while loop can be used to obtain the mount structure chain and subsequently deduce the vfsmount chain. At 710, the vfsmount structure has a member of mnt_root, which has a structure type of struct dentry. The dentry structure has a member of d_subdirs, which has a structure type of "struct list_head." At 712, all of the subdirectories' dentry nodes are attached to its parent dentry's d_subdirs list_head pointer. By looping through d_subdirs, all of the subdirectory's dentry struct can be obtained. At 714, the dentry structure has a member of d_inode, which has a structure type of "struct mode," and d_name, which has a type of "struct qstr," from which it can be determined whether a file to be found has already been recovered. At 716, the mode structure has a member of i_mapping, which has a structure type of "struct address_space." At 718, the address_space structure has a member of page_tree, which has a structure type of "struct radix_tree_root." At 720, because the root point for one radix tree can be obtained at 718, where the root point for the one radix tree content stores one page of data, by walking out from the tree's present node, all pages that composite original files can be obtained. In this manner, files in trnpfs may be recovered.

Figure 8:
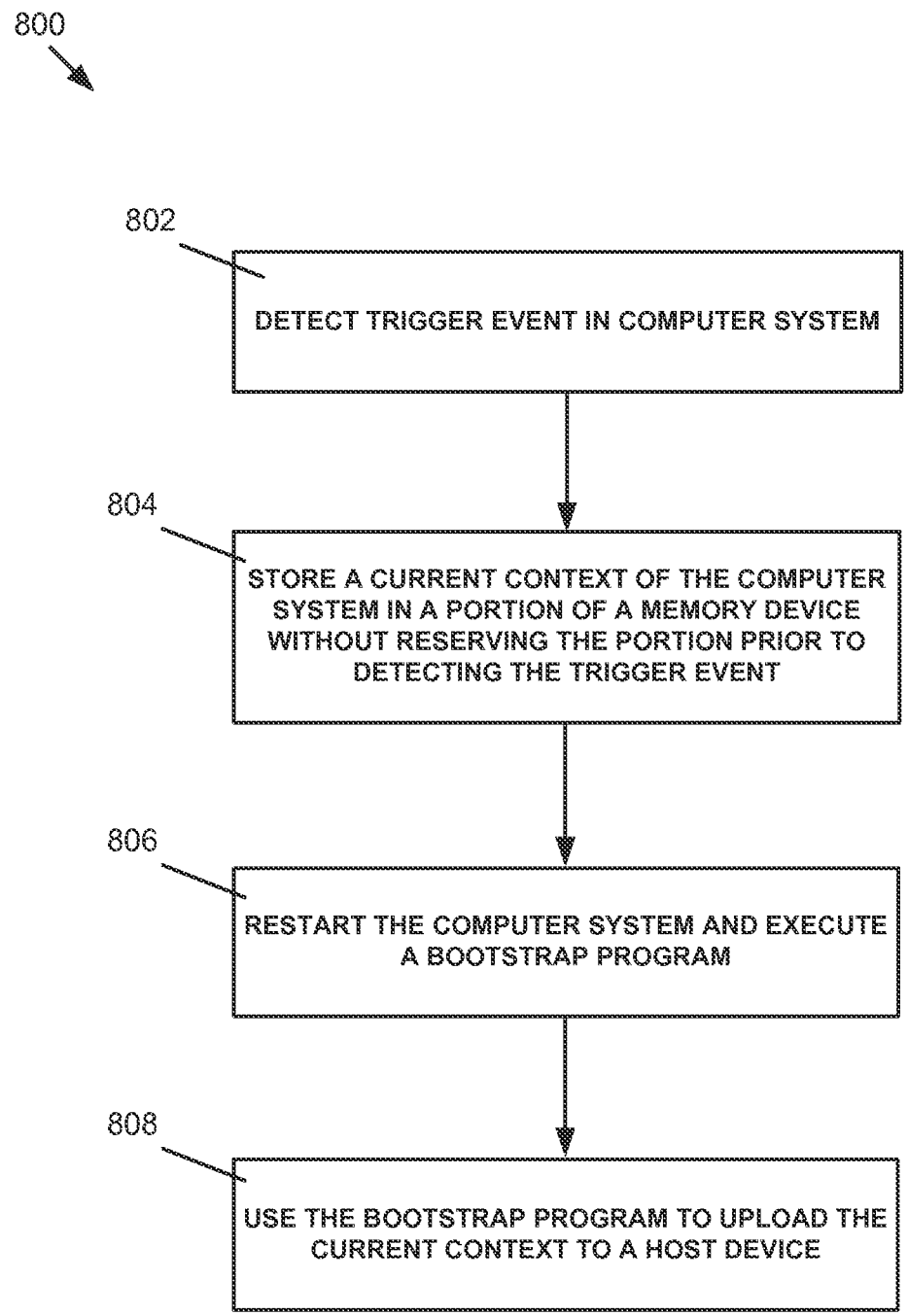
FIG. 8 is a flowchart illustrating an example method for executing a memory dump in a computer system.

FIG. 8 is a flowchart 800 illustrating an example method for executing a memory dump in a computer system. At 802, a trigger event is detected in the computer system. The computer system is configured to detect both a kernel panic and a system hang and to execute the memory dump if either of the kernel panic or the system hang is detected. The memory dump is executed in the computer system in response to the detecting of the trigger event. At 804, a current context of the computer system is stored in a portion of a memory device. The current context is stored without reserving the portion prior to the detecting of the trigger event. At 806, the computer system is restarted and a bootstrap program is executed, where a running space of the bootstrap program is restricted to the portion of the memory device. At 808, the bootstrap program is used to upload the current context to a host device.

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A method for executing a memory dump in a computer system, the method comprising:
   detecting a trigger event in the computer system, the computer system being configured to detect both a kernel panic and a system hang and to execute the memory dump if either of the kernel panic or the system hang is detected; and
   executing the memory dump in the computer system in response to the detecting of the trigger event, the execution of the memory dump including:
      storing a current context of the computer system in a portion of a memory device, wherein the portion of the memory device is a static random access memory (SRAM), wherein prior to the detecting of the triggering event the portion is reserved for use as a video memory, and wherein the current context is stored without reserving the portion for use in the memory dump prior to the detecting of the trigger event,
      writing of a signature at a specific position in the memory device,
      restarting the computer system and executing a bootstrap program, wherein a running space of the bootstrap program is restricted to the portion of the memory device, and wherein the execution of the bootstrap program includes detecting the signature at the specific position of the memory device,
      downloading, from a host device, instructions indicating a start address and a size of data, containing the stored current context, to be uploaded to the host device,
      compressing a memory interval of the portion of the SRAM memory device based on the instructions, and
      using the bootstrap program to upload the compressed memory interval to the host device in response to the signature being detected.

2. The method of claim 1, wherein the compressed memory interval is uploaded via a Universal Serial Bus (USB) protocol.

3. The method of claim 2 wherein the instructions are downloaded in a USB packet.

4. The method of claim 1, wherein the executing is performed using a single operating system kernel.

5. The method of claim 1, further comprising:
   detecting the system hang with a watchdog timer, wherein the detecting causes the computer system to restart and causes the memory dump to be executed.

6. The method of claim 1, further comprising:
storing the current context at the host device in a mapping file; and
analyzing the mapping file at the host device via a kernel dump map analysis tool.

7. The method of claim 6, further comprising:
analyzing the mapping file at the host device via the kernel dump map analysis tool, wherein the analyzing is configured to recover file systems and file contents of the current context.

8. The method of claim 1, wherein the computer system is an embedded device.

9. The method of claim 8, wherein the embedded device is a smart phone.

10. A computer-implemented system for executing a memory dump in a computer system, the computer-implemented system comprising:
a processor; and
a computer-readable memory encoded with instructions for commanding the processor to perform steps of:
detecting a trigger event in the computer system, the computer system being configured to detect both a kernel panic and a system hang and to execute the memory dump if either of the kernel panic or the system hang is detected; and
executing the memory dump in the computer system in response to the detecting of the trigger event, the execution of the memory dump including:
storing a current context of the computer system in a portion of a memory device, wherein the portion of the memory device is a static random access memory (SRAM), wherein prior to the detecting of the triggering event the portion is reserved for use as a video memory, and wherein the current context is stored without reserving the portion for use in the memory dump prior to the detecting of the trigger event,
writing a signature at a specific position of the memory device,
restarting the computer system and executing a bootstrap program, wherein a running space of the bootstrap program is restricted to the portion of the memory device, and wherein the execution of the bootstrap program includes detecting the signature at the specific position of the memory device,
downloading, from a host device, instructions indicating a start address and a size of data, containing the stored current context, to be uploaded to the host device,
compressing a memory interval of the portion of the SRAM memory device based on the instructions, and
using the bootstrap program to upload the compressed memory interval to the host device in response to the signature being detected.

11. The system of claim 10, wherein the current context is uploaded via a Universal Serial Bus (USB) protocol.

12. The system of claim 11, wherein the instructions are downloaded in a USB packet.

13. The system of claim 10, wherein the steps further include:
detecting the system hang with a watchdog timer, wherein the detecting causes the computer system to restart and causes the memory dump to be executed.

14. A method comprising:
detecting, by a computing device, a trigger event comprising at least one of a kernel panic and a system hang;
performing, in response to detecting the trigger event, a memory dump by storing a current context of the computing device in a static random access memory (SRAM) device that is in the computing device, wherein the current context is stored (i) in a portion, of the SRAM device, that is assembly reserved as a video memory portion and (ii) without reserving the portion for use in the memory dump;
executing, by the computing device upon restart of the computing device, a context-upload program whose running space is restricted to the video memory portion;
downloading, by the computing device from a host device, instructions indicating a start address and a size of data, containing the stored current context, to be uploaded to the host device;
compressing, by the computing device, a memory interval of the portion of the SRAM memory device based on the instructions; and
uploading, by the upload program, the compressed memory interval to the host device.

15. The method of claim 14, wherein the computing device is a smart phone, and wherein the host device is a personal computer.

16. The method of claim 14, wherein the uploading is through a Universal Serial Bus (USB) interface.

17. The method of claim 14, wherein the detecting, the performing, the executing and the uploading are performed as part of an open air test of the computing device.

18. The method of claim 14, wherein:
the computing device is a smart phone;
the host device is a personal computer (PC);
the downloading and the uploading are through a Universal Serial Bus (USB) interface; and
the detecting, the performing, the executing and the uploading are performed as part of an open air test of the smart phone.

* * * * *